United States Patent [19]

Yamauchi et al.

[11] Patent Number: 5,059,291
[45] Date of Patent: Oct. 22, 1991

[54] HUMIDITY CONTROLLER

[75] Inventors: Shiro Yamauchi; Naotake Rito, both of Amagasaki, Japan

[73] Assignee: Mitsubishi Denki Kabushiki Kaisha, Japan

[21] Appl. No.: 365,899

[22] Filed: Jun. 14, 1989

[30] Foreign Application Priority Data

Nov. 9, 1988 [JP] Japan ................... 63-284411

[51] Int. Cl.$^5$ ............... G01N 27/26; G01W 1/02; C25B 11/03
[52] U.S. Cl. ................ 204/153.22; 204/425; 204/430; 204/283; 73/335; 73/336.5
[58] Field of Search ............. 204/283, 278, 430, 425, 204/421, 1 W, 279, 296, 255-258, 252-254; 73/335, 336.5

[56] References Cited

U.S. PATENT DOCUMENTS

| | | | |
|---|---|---|---|
| 3,188,283 | 6/1965 | Cole | 204/430 X |
| 4,562,725 | 1/1986 | Oka et al. | 204/430 X |
| 4,693,953 | 9/1987 | Torikai | 204/1 W X |

Primary Examiner—Donald R. Valentine
Attorney, Agent, or Firm—Leydig, Voit & Mayer

[57] ABSTRACT

A humidity controller has a humidity controlling element disposed in the opening of a chamber and comprising a hydrogen ion conductor membrane, porous electrodes disposed on two surfaces of the hydrogen ion conductor membrane and collecting electrodes disposed on opposite surfaces of the porous electrodes. Each of the collecting electrodes is disposed over an area than the whole area of each surface of the hydrogen ion conductor membrane such that the current density at a portion of the hydrogen ion conductor membrane where no collecting electrode is located is reduced by at most ½, thereby reducing the stress due to the difference between the thermal expansion coefficients of the porous electrodes and the collecting electrodes and limiting disconnection between these two groups of electrodes. The difference between the humidity control performance of this humidity controller and that of an arrangement in which collecting electrodes are disposed over the whole surfaces of the porous electrodes is small.

13 Claims, 4 Drawing Sheets

FIG. I
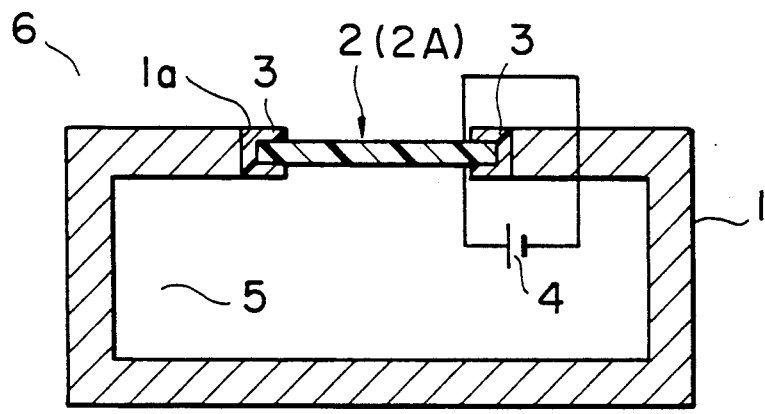
FIG. 2(a)
PRIOR ART
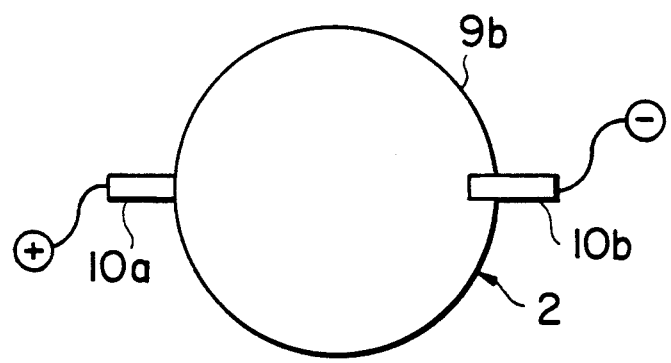
FIG. 2(b)
PRIOR ART
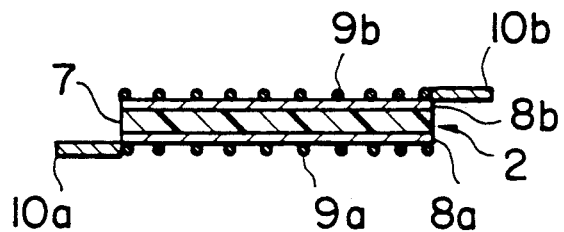

HUMIDITY CONTROLLER

BACKGROUND OF THE INVENTION

This invention generally relates to humidity controllers and more particularly to a humidity controller for controlling, i.e., humidifying or dehumidifying, the interior of a chamber in which a magnetic disk or the like is housed.

Design of hard magnetic disk apparatuses in which the extent to which the magnetic head is floated above the surface of a magnetic disk is minimized, e.g., set to a value of 0.2 $\mu$m or less, is now being studied. In such a magnetic disk apparatus designed for high-density recording, when the humidity inside the apparatus is higher than a certain level, there is a possibility of occurrence of local dew condensation which may cause the magnetic head and the magnetic disk to adhere to each other, thereby preventing the apparatus from operating. To cope with this problem, an improved humidity controller which is designed to electro-chemically decompose moisture inside the apparatus and to maintain a highly dehumidified state has been proposed.

FIG. 1 schematically shows in section an example of this type of conventional humidity controller disclosed in Japanese Patent Laid-Open No 62-277126. A chamber 1 in which a magnetic disk and a magnetic head (not shown) and other components are housed has an opening 1a. A humidity controlling element 2 is disposed in the opening 1a with an insulating member 3 interposed between the humidity controlling element 2 and the edge of the opening 1a. The insulating member 3 is formed by injection molding on the edge of the humidity controlling element 2. A dc power source 4 is connected to the humidity controlling element 2 to supply the same with a dc current. FIGS. 2(a) and (b) show details of the humidity controlling element 2 in plan and in section, respectively. The humidity controlling element 2 has a hydrogen ion conductor membrane 7, e.g., an ion exchange membrane made of a fluorine resin or, more specifically, Nafion (commercial name of a product of Dupont. Porous electrodes 8a and 8b which are porous platinum films are respectively formed by plating on the obverse and reverse surfaces of the hydrogen ion conductor membrane 7. Collecting electrodes 9a and 9b each in the form of a mesh are connected to surfaces of the porous electrodes 8a and 8b. Each of the collecting electrodes 9a and 9b is formed by partially cutting a titanium lamella alternately and finely and thereafter expanding the same to obtain an expanded metal. An anode terminal 10a and cathode terminal 10b are connected to peripheral portions of the collecting electrodes 9a and 9b.

The principle of dehumidification of the interior of the chamber will be schematically described below. After the power source 4 has been turned on, a dc current introduced through the anode terminal 10a spreads over the collecting electrode 9a having a high conductivity, then passes the porous electrode 8a, the hydrogen ion conductor membrane 7 and the porous electrode 8b, and reaches the other collecting electrode 9b. The current converges at this electrode, then flows out through the cathode terminal 10b and returns to the power source 4. The following decomposition reaction of water $H_2O$ existing in the interior space of the chamber 5 first takes place at the interface between the porous electrode 8a and the hydrogen ion conductor membrane film 7:

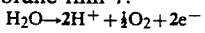

$O_2$ caused by this decomposition stays in the interior of the chamber 5, and hydrogen ions $H^+$ proceed to the porous electrode 8b through the hydrogen ion conductor membrane 7. Electrons $e^-$ are supplied from the collecting electrode 9a to the porous electrode 8a via the anode terminal 10a, the power source 4 and the collecting electrode 9b.

At the interface between the hydrogen ion conductor membrane 7 and the porous electrode 8b facing the outside 6, one or both of the following reactions take place between $H^+$ ions moved through the hydrogen ion conductor membrane 7, electrons $e^-$ supplied through the collecting electrode 9b and $O_2$ supplied from the outside 6 of the chamber:

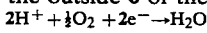

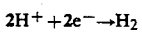

Water ($H_2O$) or $H_2$ thereby generated is diffused on the outside 6 of the chamber. Thus, water is successively removed from the interior of the chamber.

In the above-described type of conventional humidity controller, the collecting electrodes 9a and 9b are respectively connected to the porous electrodes 8a and 8b by being disposed over the whole surfaces thereof. This is because, if the porous electrodes 8a and 8b having a comparatively large resistance are used alone, spreading and conversion of the current between the terminals 10a and 10b are not effected adequately, and the reaction is not effected uniformly over the hydrogen conductor membrane 7, resulting in difficulty in achieving the desired dehumidifying performance. The collecting electrodes 9a and 9b having a high conductivity are connected to the surfaces of the porous electrodes 8a and 8b in order to make the current flow uniform and stable.

Thus, the desired performance can be realized if the humidity controller is used at a certain temperature. However, the temperature inside the chamber 1 changes immediately after the magnetic disk apparatus has started or stopped operating. Since the linear expansion coefficient of the porous electrodes 8a and 8b (made of platinum) formed by plating on the hydrogen ion conductor membrane 7 differs from that of the collecting electrodes 9a and 9b (made of titanium), the collecting electrodes 9a and 9b, which have been in a normal state as shown in FIG. 3(a), are deformed and bent as the temperature is repeatedly changed. The connection between the collecting electrodes 9a and 9b and the porous electrodes 8a and 8b is broken over a large area, as shown in FIG. 3(b), if the change in temperature becomes about tens of degrees per hour. FIG. 4 shows the relationship between the maximum value of this bending for certain materials used as the collecting electrodes. The extent of bending varies depending upon the material, but, regardless of the material, disconnection causes a considerable reduction in the dehumidifying performance.

SUMMARY OF THE INVENTION

In view of these problems, an object of the present invention is to provide a humidity controller capable of performing stable humidity control no matter what the change in temperature.

A humidity controller according to the present invention includes a chamber having an opening, a humidity controlling element disposed in the opening to isolate the interior of the chamber from the outside, and a dc power source connected to the humidity controlling element. The humidity controlling element comprises a hydrogen ion conductor membrane, porous electrodes disposed on two surfaces of the hydrogen ion conductor membrane, and collecting electrodes disposed on opposite surfaces of the porous electrodes. Each of the collecting electrodes is disposed over an area smaller than the whole area of each surface of the hydrogen ion conductor membrane such that the current density at a portion of the hydrogen ion conductor membrane where no collecting electrode is disposed is at least $\frac{1}{2}$ the current density at the portion of the hydrogen ion conductor membrane where the collecting electrodes are disposed.

In the present invention, a stress is caused in the collecting electrodes owing to the difference between the linear expansion coefficients of the collecting electrodes and the porous electrodes, but disconnection between the collecting electrodes and the porous electrodes which may be caused by the stress can be avoided because the area of contact therebetween is small. A current flows through the portion of the hydrogen ion conductor where no collecting electrodes are provided with a current density not less than $\frac{1}{2}$ the current density at the portion of the hydrogen ion conductor where the collecting electrodes are disposed. The effect of the portion where no electrodes are disposed on humidity control is therefore small.

BRIEF DESCRIPTION OF THE DRAWINGS

FIG. 1 is a schematic cross-sectional view of a conventional humidity controller or a humidity controller according to an embodiment of the present invention;

FIGS. 2(a) and 2(b) are plan and sectional side views of a humidity controlling element for use in the conventional humidity controller shown in FIG. 1;

DESCRIPTION OF THE PREFERRED EMBODIMENT

Figure 5A:
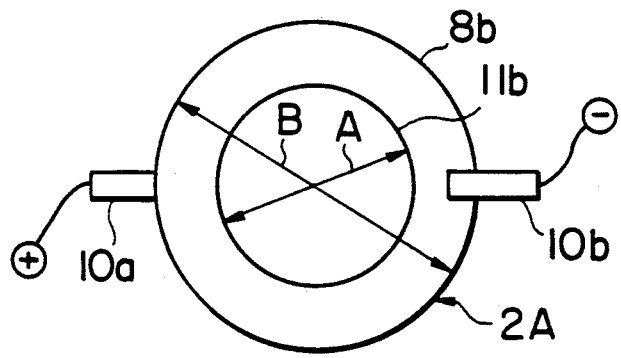
FIGS. 5(a) and 5(b) are plan and cross-sectional views of a humidity controlling element for use in an embodiment of a humidity controller of the present invention.
Figure 5B:
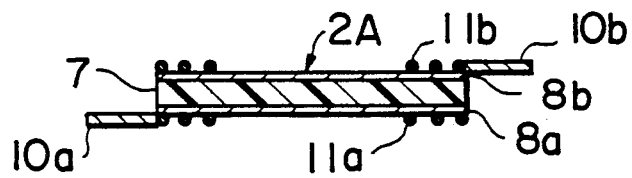

An embodiment of the present invention will be described below with reference to the accompanying drawings. FIGS. 5(a) and 5(b) show in plan and in section an embodiment of a humidity controller 2A of the present invention. In FIGS. 5(a) and 5(b), the same reference characters as those of FIGS. 2(a) and 2(b) indicate the same or corresponding portions. Components of this embodiment may be similar to those of the conventional humidity controller. Collecting electrodes 11a and 11b may be formed of the same material as the conventional humidity controlling element but the areas of connection between the collecting electrodes 11a and 11b and porous electrodes 8a and 8b are specifically limited. Each of the collecting electrodes 11a and 11b has a shape of the ring with an inside diameter A and an outside diameter B, and there are no portions of electrodes 11a and 11b located within the area defined by the inside diameter A. The humidity controlling element 2A having the thus-constructed collecting electrodes 11a and 11b disposed in an opening 1a of a chamber 1, as shown in FIG. 1.

If the inside diameter A of each of the collecting electrodes 11a and 11b is increased while the outside diameter B is maintained constant, the mechanical stress due to a change in the temperature during operation is reduced, but electrical requirements for supplying a current uniformly to the hydrogen ion conductor membrane 7 become impossible to satisfy. Conversely, if the inside diameter A is reduced, the electrical requirements become satisfied, but the possibility of disconnection between the electrodes increases. The inventors of the present invention made samples having various inside diameters A. Characteristics of the samples which were measured after the temperature had been periodically changed (between $-20°$ C. and $100°$ C. with a period of 2 hours) for 100 cycles were compared with initial characteristics some of the samples having the best characteristics are specified below.

Specifications of Sample

Figure 6:
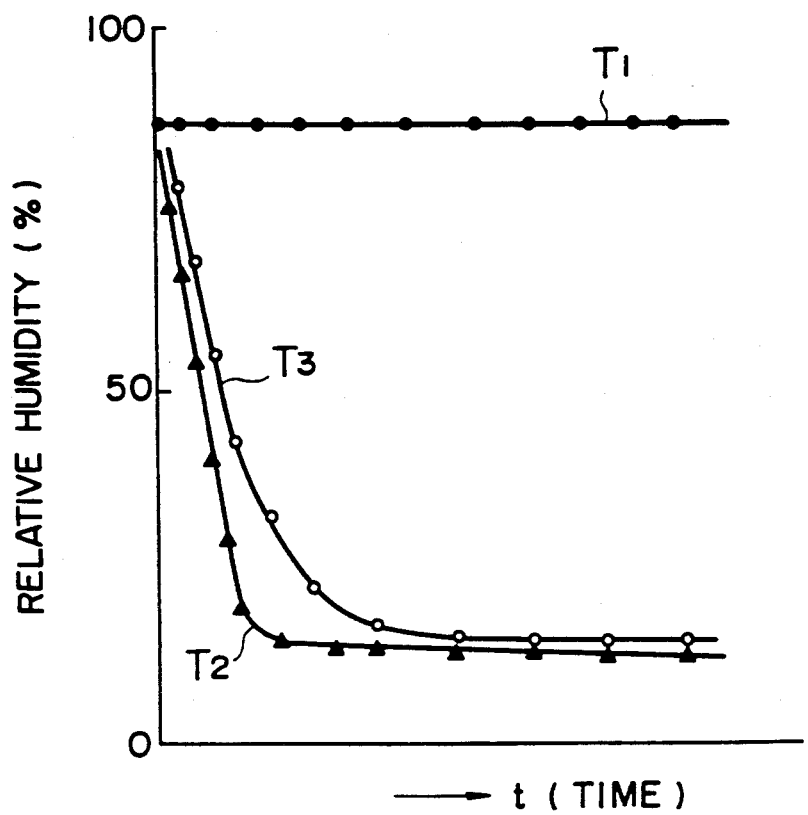
FIG. 6 is a diagram of dehumidifying performance of a conventional humidity controller and a humidity controller according to the present invention.

Hydrogen ion conductor membrane (Nafion)
  Outside diameter: 1.6 cm
Porous electrodes (porous platinum member)
  Outside diameter: 1.6 cm
Collecting electrodes (titanium foil expanded metal)
  Outside diameter: 1.6 cm
  Inside diameter: 1.0 cm FIG. 6 shows a comparison between the dehumidifying characteristics of this sample and the corresponding characteristics of the conventional humidity controlling element. In FIG. 6, $T_1$ indicates the relative humidity on the outside of the chamber with elapse of time, and $T_2$ indicates the relative humidity with elapse of time inside the chamber of the conventional humidity controller in which the collecting electrodes are formed over the whole surfaces of the porous electrodes. This characteristic was measured as an initial characteristic. $T_3$ indicates the relative humidity with elapse of time inside the chamber of the sample in accordance with the present invention. This characteristic was measured after the heat cycle test specified above. As can be seen from the results of this experiment, the difference between the dehumidifying characteristics of the sample of the present invention and the humidity controller having the collecting electrodes disposed over the whole surfaces of the porous electrodes was small, and but the characteristics of the sample of the present invention were stable against heat cycles. After the experiment, substantially no bending of the collecting electrodes 11a and 11b was observed, and disconnection between the collecting electrodes 11a and 11b and the porous electrodes 8a and 8b was not observed at any portion. It is thought that the stress due to the difference of the linear expansion coefficients between the collecting electrodes 11a and 11b and the porous electrodes 8a and 8b was reduced because the area of contact therebetween or dimensions of the contact area therebetween were reduced. It was found that a reduction in the dehumidifying performance was considerable when the inside diameter A of the collecting electrode was larger than 1.0 cm, and that the area of positions of disconnection between the electrodes gradually increased as this diameter was reduced below 1.0 cm.

Figure 7:
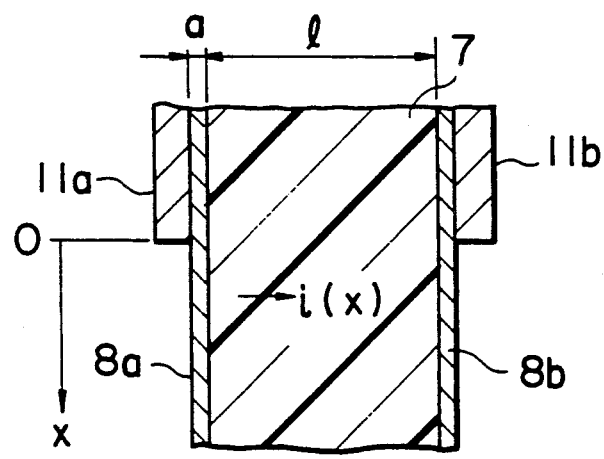
FIG. 7 is a schematic diagram relating to calculation of the current intensity in the hydrogen ion conductor membrane.

The current distribution over the portion where no collecting electrode is provided will be examined below. FIG. 7 is an enlarged cross-sectional view of end portions of the collecting electrodes 11a and 11b. In FIG. 7, reference character i represents the intensity of current per unit area flowing through the hydrogen ion conductor membrane 7, i.e., the current density which is a function of the distance x from the ends of the collecting electrodes 11a and 11b. Assuming that the conductivity of the mating electrode is sufficiently large, a characteristic of attenuation of the current density i is obtained by the following equation on the basis of, for example, pp 198 to 201 of "Electrochemistry III" (issued by Kyoritsu Shuppan K.K. on Oct. 25, 1974):

$$\frac{i}{i_O} = \exp\left[-\sqrt{\frac{K}{6al}} \cdot x\right]$$

where
- $i_O$: current density at the ends of the collecting electrodes, i.e., when $x=0$;
- $K$: conductivity of the hydrogen ion conductor membrane, $1\times10^{-3}\Omega^{-1}cm^{-1}$ in this example;
- $\sigma$: conductivity of the porous electrodes, $1\times10^{2}\Omega^{-1}cm^{-1}$ in this example;
- $a$: thickness of the porous electrodes, $3\times10^{-4}$ cm in this example;
- $l$: thickness of the hydrogen ion conductor membrane, $1.7\times10^{-2}$ cm in this example; and
- $x$: distance (cm) from the ends of the collecting electrodes.

Figure 8:
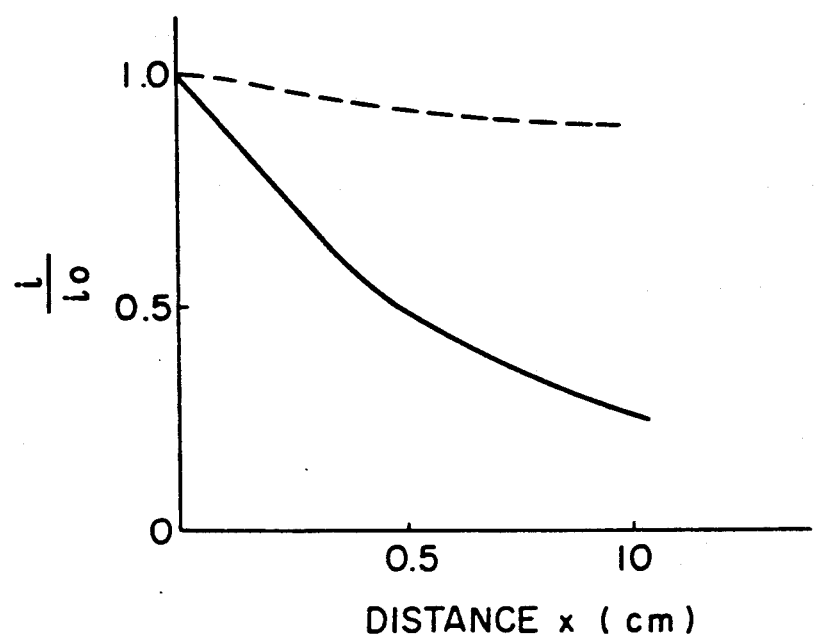
FIG. 8 is a diagram of current density versus position.

A characteristic obtained by this equation is illustrated in FIG. 8. From this characteristic, $i/i_O \approx 0.5$ is obtained because $x=0.5$ cm in the sample specified above (in which the inside diameter of the collecting electrodes is 1.0cm=2x). That is, it is found that the current density is reduced by a maximum of about 50% where no portion of the electrodes 11a and 11b is located.

From the results of experiment and from the characteristics of the current density, it is found that if each of the collecting electrodes 11a and 11b is made smaller than the porous electrodes 8a and 8b while the minimum value of the density of the current flowing through the hydrogen ion conductor membrane 7 is kept equal to or higher than ½ of the value of the current density in the portion where the collecting electrodes 11a and 11b are provided, the stress due to the difference between the linear expansion coefficients of the collecting electrodes and the porous electrodes is reduced correspondingly, and the stability of the humidity controlling element 2 is improved The dehumidifying ability of the resulting humidity controller is substantially the same as the arrangement in which the collecting electrodes are disposed over the whole surfaces of the porous electrodes.

Figure 3A:
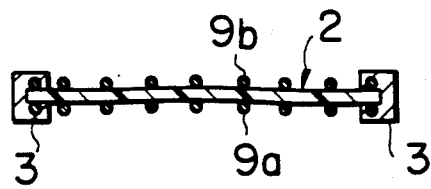
FIG. 3(a) and 3(b) are sectional views of deformation of collecting electrodes caused by a change in temperature.
Figure 3B:
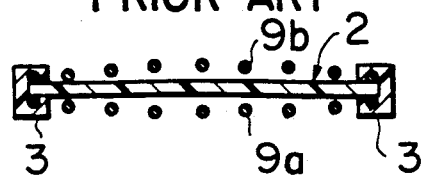
Figure 4:
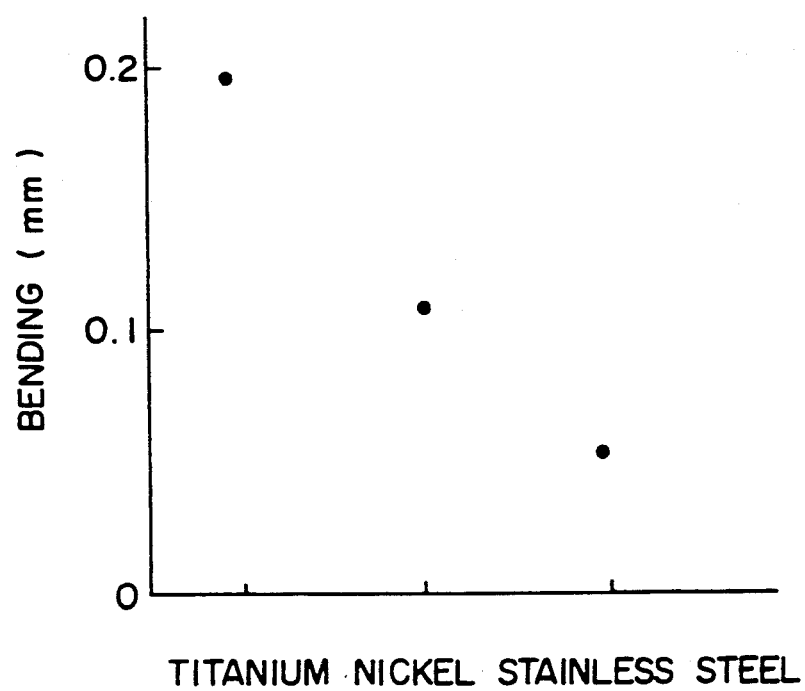
FIG. 4 is a diagram of the relationship between the bending constituting the collecting electrode and the material of the collecting electrode.

The current density depends upon factors including the conductivity of materials used to form the components of the humidity controller, as expressed in the above equation. For example, members having a conductivity $K=1\times10^{-3}\Omega^{-1}cm^{-1}$ and a conductivity $\sigma=1\times10^{3}\Omega^{-1}cm^{-1}$ can be prepared. In this case, it is possible to obtain a characteristic such as that indicated by the dashed line in FIG. 4 and, hence, to further increase the distance x.

In the above-described embodiment, each of the collecting electrodes is annular, but the shape of the collecting electrode is not so limited and can be formed in other various shapes. It is not always necessary to form the insulating member 3 by injection molding; it is possible to select any other method, e.g., casting or transfer molding in consideration of the properties of the humidity controlling element 2.

It is to be understood that the present invention is not limited to the system of dehumidifying the interior of the chamber of magnetic disk apparatus and that the present invention can be applied to various systems, e.g., a system in which the interior of the chamber is humidified by setting the direction of energization of the humidity controlling element reverse to that in the case of the above-described embodiment.

In accordance with the present invention, as described above, each collecting electrode is made smaller than the porous electrodes while the current density is prevented from being reduced by half, and the stress due to the difference between the linear expansion coefficients of the two groups of electrodes is thereby reduced. As a result disconnection between the two groups of electrodes is prevented and the stability of the resulting humidity is improved while achieving substantially the same humidity control as an arrangement in which the collecting electrodes are disposed over the whole surfaces of the porous electrodes.

What is claimed is:

1. A humidity controller comprising:
   a chamber having an opening;
   a dc power source; and
   a humidity controlling element disposed in said opening and isolating the interior of said chamber form the outside thereof, said humidity controlling element comprising a hydrogen ion conductor membrane, porous electrodes disposed on two surfaces of said hydrogen ion conductor membrane, and collecting electrodes disposed on opposite surfaces of said porous electrodes and connected to said dc power source, wherein each of said collecting electrodes is a metallic mesh disposed over an area smaller than the whole area of each surface of said hydrogen ion conductor membrane and the current density in said hydrogen ion conductor membrane where no collecting electrode is disposed is at least ½ the current density in said hydrogen ion conductor membrane where said collecting electrodes are disposed.

2. A humidity controller according to claim 1 wherein said hydrogen ion conductor membrane is an ion-exchange membrane formed of a fluorine resin.

3. A humidity controller according to claim 1 wherein each of said collecting electrodes has an annular shape.

4. A humidity controller according to claim 1 wherein the hydrogen ion conductor membrane and collecting electrodes are circular, the outside diameter of said hydrogen ion conductor membrane is 1.6 cm, and the outside and inside diameters of each of said collecting electrodes are 1.6 cm and 1.0 cm, respectively.

5. A humidity controller according to claim 1 wherein said humidity controlling element is mounted at said opening with an insulating member.

6. A humidity controller according to claim 5 wherein said insulating member is formed by injection molding at the edge of said humidity controlling element.

7. A humidity controller according to claim 7 wherein said insulating member is formed by casting at the edge of said humidity controlling element.

8. A humidity controller according to claim 7 wherein said insulating member is formed by transfer molding at the edge of said humidity controlling element.

9. A humidity controller according to claim 1 wherein a hard magnetic disk unit is housed in said chamber.

10. A humidity controller according to claim 1 for dehumidifying.

11. A humidity controller according to claim 1 for humidifying.

12. A humidity control element comprising:
a hydrogen ion conductor membrane having first an second surfaces; of
first and second porous electrodes disposed on the first and second surfaces of the hydrogen ion conductor; and
first and second metallic mesh collecting electrode connected to and partially covering opposite surfaces of the first and second porous electrodes, respectively, each of the collecting electrodes having a hollow portion at the center thereof where the corresponding porous electrode is uncovered, the size of the uncovered portions being such that when a voltage is applied to the collecting electrodes, the current density in the hydrogen ion conductor membrane between the uncovered portions of the porous electrode is at least ½ the current density in the hydrogen ion conductor membrane between the covered portions of the porous electrodes.

13. A humidity control element comprising:
a disc-shaped hydrogen ion conductor membrane having first and second surfaces;
first and second disc-shaped porous electrodes disposed on the first and second surfaces of the hydrogen ion conductor; and
first and second annular collecting electrodes connected to and partially covering the first and second porous electrodes, respectively, on opposite sides of the hydrogen ion conductor membrane, each of the collecting electrodes being made of a mesh of an expanded metal and having a hole at its center where the surfaces of the porous electrodes are uncovered, the size of the uncovered portions being such that when a voltage is applied to the collecting electrodes, the current density in the hydrogen ion conductor membrane between the uncovered portions of the porous electrodes is at least ½ the current density in the hydrogen ion conductor membrane between the covered portions of the porous electrodes.

* * * * *

UNITED STATES PATENT AND TRADEMARK OFFICE
CERTIFICATE OF CORRECTION

PATENT NO. : 5,059,291

DATED : October 22, 1991

INVENTOR(S) : Yamauchi et al

It is certified that error appears in the above-identified patent and that said Letters Patent is hereby corrected as shown below:

Title Page:
In Item No. [57], Abstract, line 8, after "area" (1st Occur.) insert --smaller--.

Column 6, line 39, change "form" to --from--.

Column 7, line 8, Claim 7, change "7" to --1--.

Column 8, line 6, change "electrode" to --electrodes--.

Column 7, line 11 change "7" to --5--.

Signed and Sealed this

Twenty-third Day of March, 1993

Attest:

STEPHEN G. KUNIN

*Attesting Officer*  *Acting Commissioner of Patents and Trademarks*